March 17, 1931. W. STEINKELLNER 1,796,412
MACHINE FOR PREPARING SLICES OF BREAD AND BUTTER
Filed July 23, 1927 6 Sheets-Sheet 1

Inventor
W. Steinkellner
By Marks & Clerk
Attys.

Patented Mar. 17, 1931

1,796,412

UNITED STATES PATENT OFFICE

WALTER STEINKELLNER, OF VIENNA, AUSTRIA

MACHINE FOR PREPARING SLICES OF BREAD AND BUTTER

Application filed July 23, 1927, Serial No. 208,018, and in Austria October 21, 1926.

This invention relates to improvements in machines for preparing slices of bread and butter.

Several modes of carrying out the present invention are illustrated by way of example on the accompanying sheets of drawings in which—

The machine essentially comprises a two-part frame 1 and 2, and a transverse slide 3, which is slidably arranged in the upper part 2 of the frame. By means of bevel wheels a disc 6 is driven by a shaft 4, which is arranged in the base 1 of the machine and is rotated manually by a crank handle 5 or mechanically by a motor or the like. The disc 6 is provided with a crank pin 7, which engages and is adapted to slide in a slot of the lever 8, pivotally attached to a pin 9. Thus on operating the shaft 4, the lever 8 carries out a to and fro movement. The free end of the lever 8 is provided with a pin 10, in which is adjustably disposed a bolt 11, the forward end of the latter carrying a pawl 12, which is secured in the two end-positions by a spring, namely in the elongation of the bolt 11 or folded down at an angle to the same.

Figure 4:
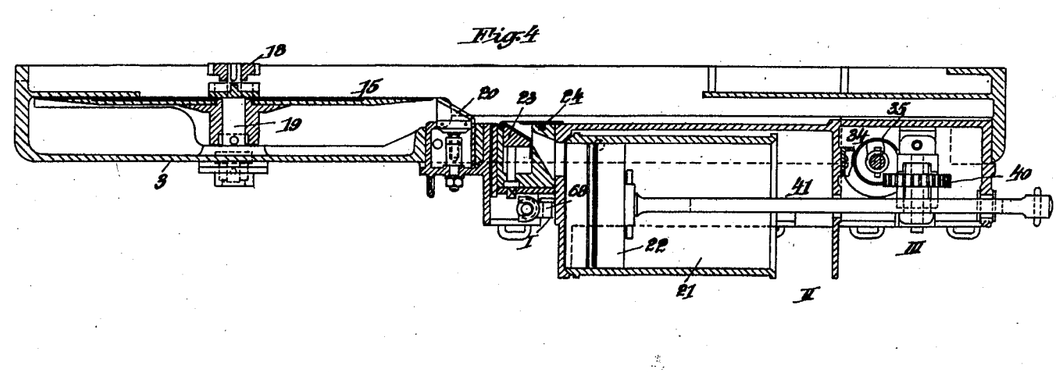
Figures 5, 6, 7, 8:
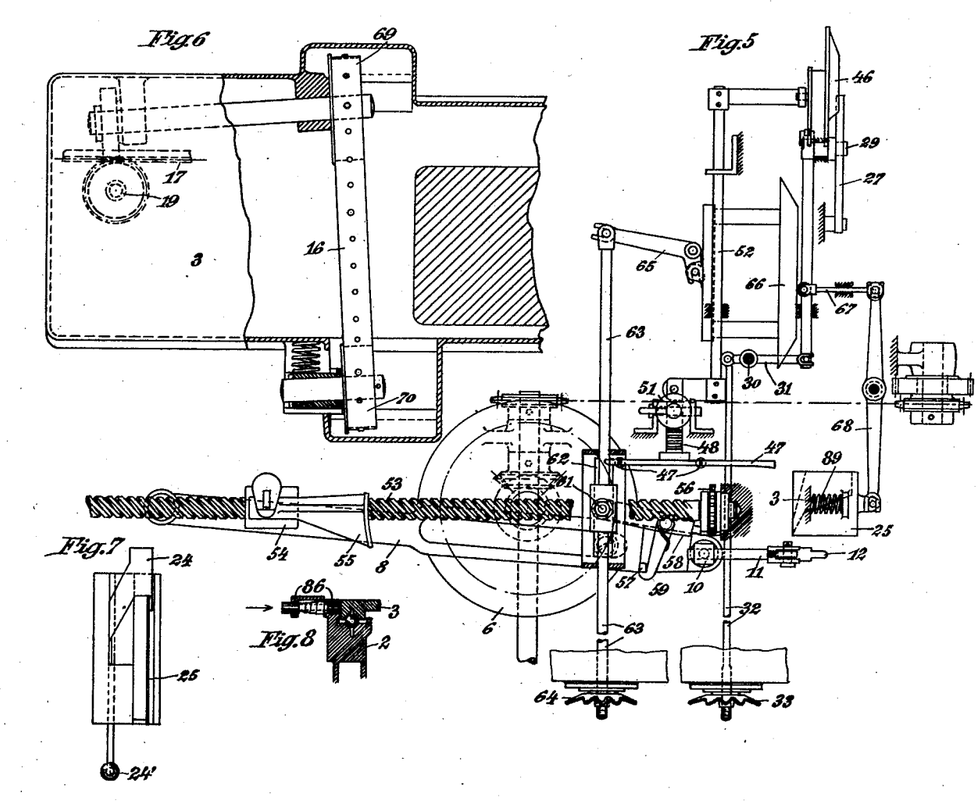
Fig. 5 shows in plan view the adjusting and feed mechanism.
Fig. 6 illustrates a modified construction of the cutting mechanism.
Figs. 7 and 8 are detail views.

The conveniently shaped end of the pawl passes through a slot 13 of the casing into the recess of an extension 14 of the slide 3. As long as the pawl engages the slide 3, the latter is reciprocated, while the slide is disengaged when folding down the pawl 12 and can be entirely removed from the rails. A cutting device and a spreading device are mounted in the slide. The cutting device consists either of a cutter disc 15 (Figs. 3 and 4) or a band cutter 16 (Fig. 6).

Figure 1:
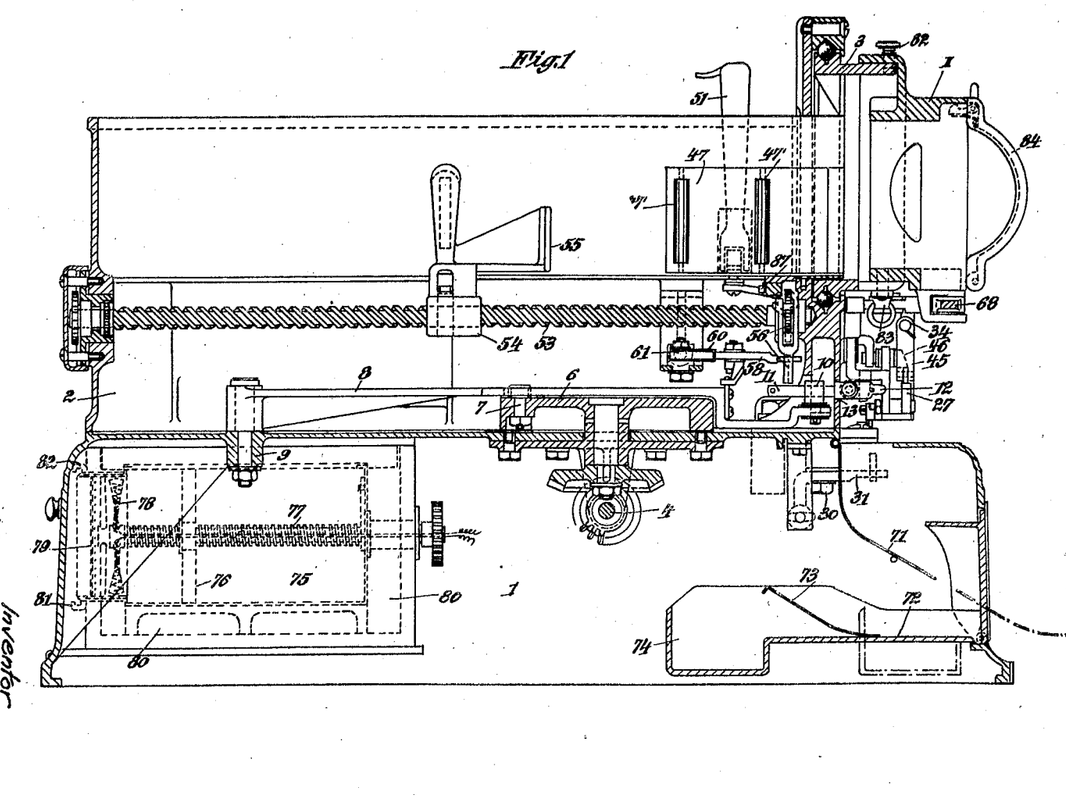
Figs. 1 and 2 show the machine in sectional elevation and front view respectively.
Figure 2:
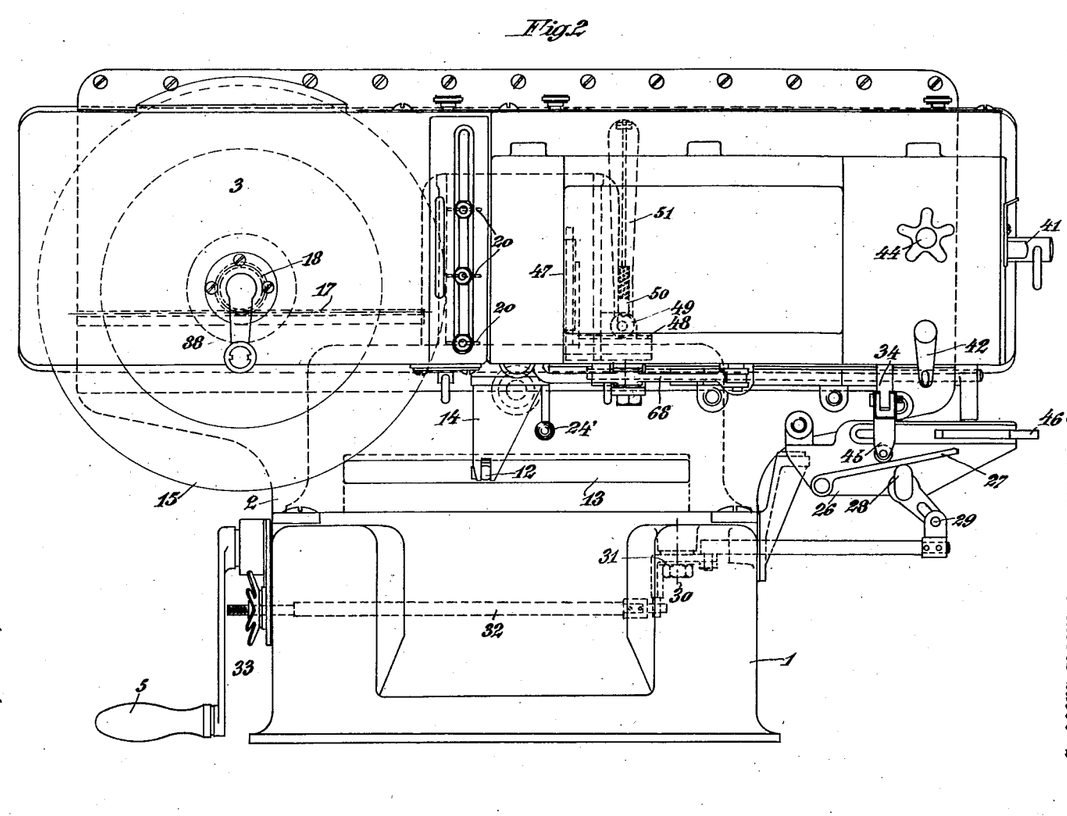

A rack 17, secured to the part 2 of the frame, meshes with a pinion 18, which is mounted on the shaft 19 of the cutter disc 15. The pinion is connected with a coupling operating in one direction only, in order to prevent a backward rotation of the cutter disc during the return motion of the slide 3. The end of the shaft 19 is formed as a coupling or as a square-head, so that only the cutter disc can be rotated by means of an auxiliary crank 88 (Fig. 2) in case the latter is fitted to the said end of the shaft 19. Owing to this arrangement the cutter can be sharpened or ground in a most simple manner, without having to remove the same from the machine. Further in the casing of the cutting device are arranged any convenient number of knives 20, which cut off the bread-crust and, if desired, cut the slice into two or more parts during the passage of the cutting device. These knives 20 are disposed in front of the cutter-disc 15 and can be adjusted according to the thickness of the slice of bread.

The spreading device is disposed in a casing, which is quite separated from the cutting device and consists of three parts, which are independent of one another. The spreading device consists of a butter-receptacle with supply device, a feed-mechanism and a spreader.

The three part-casings I, II, III (Fig. 3), which contain the different mechanism, are removably arranged in the slide 3 and in the present case the top side of the said casings are fixed by spring bolts 82, which are rotatably secured to the flange of the casing, overlapping the frame of the slide, and which extend through openings of the casing-flange and the slide-frame in one end position and release the coupling after being pulled out and turned about the plate-spring, forming the arm of rotation. Catches 83 are provided at the bottom side of the slide and pass through openings of the slide-frame and the wall of the part-casing. The ends of the catch-bolts are chamfered, so that on inserting the part-casing the same is automatically latched in the manner of the latch-bolt of a door, while the part-casings can be removed only after the catch has been operated by hand.

The part-casing II, containing the butter-receptacle 21, is closed by a lid 84, which is secured in the closed position by a bolt-lock. Owing to this provision, the butter-receptacle 21 can be removed or exchanged without having to remove from the slide the three part-casings. The butter-receptacle 21, is inserted in the part-casing II readily removable and in the operative position is forced or pressed against the spreading device 25 by an eccentric lever 85 (Fig. 3) and further is furnished with an acid resistant insertion, in which operates a piston 22. The latter is fed forward automatically in accordance with the quantity of butter desired to be spread over the bread.

The piston 22 is removably connected with the piston-rod 41. Owing to this arrangement after the rod 41 is pushed back it is possible to lift out of the casing II the receptacle 21 together with the piston 22, without operating the feed-mechanism.

The spreading device adjoins the butter-receptacle 21. The former consists of an outlet, which tapers off toward the mouth and into which the butter is forced by the action of the piston 22. The mouth is adjustable according to the desired thickness of the butter to be applied. For this object the said mouth is provided with a wedge-shaped member 23 (Fig. 4), which opens the mouth to a greater or smaller extent. The second edge of the mouth is formed by a scraper 24, which is disposed at an angle with respect to the wedge-shaped member and extends into the free space of the mouth, so that the size of the mouth is determined by adjusting the scraper by means of the handle 24'. The thickness of the butter spread over the bread depends on the width of the mouth, while the quantity of the spread butter depends on the forward feed of the latter. The height of the mouth is adjusted according to the height of the cross-section of the bread to be buttered.

According to the consumption of butter, the piston 22 is fed forward by a feed mechanism, which is operated by the movement of the slide. For this object a guide rail 27 is pivotally secured to a bracket 26 of the casing 2 and is subjected to the action of a cranked lever, one arm of the latter being in the shape of an eccentric disc 28, on which rests the guide-rail 27. The other arm of the cranked lever is forked for the reception of a pin 29, which is arranged on a rod, attached to a lever 31, the latter being movable about a pivot 30. The other arm of the said lever is secured to a rod 32, which extends through the base of the machine. The end of the rod 32 is screw-threaded and a hand-wheel 33 is screwed to this end and co-operates with a dial (not illustrated). The inclined position of the guide-rail 27 can be adjusted according to requirement by operating the hand-wheel 33. A bolt 34, which is vertically adjustable against the action of a spring 35, co-operates with the inclined plane formed by the rail 27, the end of the said bolt 34 carrying a roller, which rests on the rail 27.

According to the inclined position of the rail 27, the bolt 34 is lifted to a greater or smaller extent and thus the feed device is operated to a greater or smaller extent. In case the rail is adjusted in a horizontal position, the bolt 34 is not raised or lowered and the feed device is not operated, so that the spreading device is not operated. In this case the bread is cut only without spreading butter thereon when operating the machine.

The bolt 34 is connected with a lever 37, which is pivotally secured to a shaft 36 and provided with a pawl 38, which co-operates with a ratchet-wheel 39. By means of a gearing 40, the latter co-operates with the part of the piston-rod 41, which is formed as a rack.

The rear end of the rack is not provided with teeth, in order to limit the forward feed of the piston and prevent the same from contacting with the front wall of the casing.

The gearing 40 is mounted in a bearing which is adjustable vertically and according to the adjustment of an eccentric lever 42 is retained in the position for coupling the gearing 40 with the rack 41 or in the disengaged position.

In consequence thereof it is possible to operate by hand the piston after disengaging the gearing 40. In order to facilitate or rendering possible the withdrawal of the piston, the same is provided with a valve 43, which admits the entry of air in front of the piston and thus nullifies the vacuum-effect.

It is necessary to force forward the butter by hand, because the outlet has to be filled with butter, in order to prevent the non-buttering or partly buttering of the bread at the beginning of the mechanical operation. Particularly in case the butter is harder it is not possible to feed forward the piston 22 by pressing onto the piston-rod 41 and therefore the shaft 36 of the ratchet-wheel 39 passes outward and is provided with a hand-wheel 44 for feeding forward the piston by the aid of the gearing 40.

Owing to the movement of the slide 3 the roller of the bolt 34 slides on the rail 27 and thus the bolt 34 is raised and the piston is forced forward a certain distance which is pre-determined by the inclined position of the rail 27 and thus a greater or smaller amount of the butter is forced out of the mouth.

The time during which the butter is forced out of the mouth depends on the width of the bread to be buttered. The path through which the spreading device passes remains unaltered and the time of spreading is controlled solely by the movement of the piston.

The end 45 of the bolt 34 is hinged so as to be tilted to one side, in order to adjust the time of co-operation between the rail 27 and the bolt 34. An adjustable stop 46, which can be fixed in a slot of the bracket, acts upon said end 45 of the bolt 34. During the movement of the slide the bolt slides on the rail until it comes into contact with the stop 46 and now the said bolt tilts laterally and slides off the rail, whereby the bolt is depressed by the action of the spring 35 and its effect upon the gearing is interrupted. Thus the time of spreading depends on the adjustment of the stop 46 and the width of the bread. According to the present invention the necessary adjustment of the stop 46 is carried out positive when inserting the bread. The bread is disposed in a case, which is arranged on the frame 2 of the machine and in which the bread is clamped laterally near the cutting device. The clamping device consists of a movable wall 47, which can be fixed in position and adjusted by hand and by which the bread is pressed onto the wall of the casing. During the forward feed the bread slides on rollers 47', which are arranged in the wall 47. A rack 48 extends vertically from the wall 47 and is in mesh with a pinion 49, which is mounted on the casing and operated by a ratchet-lever 51, the tooth 50 of which actuates the pinion on moving the lever in one direction. A connecting rod 52 is attached to the rack 48 and is adjustably disposed in the frame and further is connected with the stop 46. Thus on adjusting the wall 47 also the stop 46 is positively adjusted, so that the spreading time exactly corresponds with the width of the bread. Thereby the ratchet-lever 51 secures the device, because it rests against the wall of the casing. The bread has to be moved forward to a greater or smaller extent according to the desired thickness of the individual slices. The feed is effected by a screw-threaded shaft 53, which passes through the frame and by means of a disengageable nut 54 moves along the floor of the casing an angle-shaped bracket 55, which rests on the back of the bread. The shaft 53 is operated by a ratchet-gearing 56, which is operated by the adjustable lever 8. In order to attain this object the lever 8 is provided with a stop 57, which co-operates with a hook-shaped pawl 59, mounted on the rocking arm 58. The pawl 59 is pivotally secured to the arm 58 and is subjected to the action of a spring, so that it always co-operates with the stop 57 at every relative position between the lever 8 and the arm 58. Therefore on moving the rocking lever 8, the arm 58 is also rocked and thereby operates the ratchet, disposed at the end of the screw-threaded shaft 53. The return motion of the arm 58 and thus of the ratchet 56 is carried out by a spring 69 which acts upon the arm 58. The rotation of the shaft 53 and thus the size or extent of the feed depend on the angular rotation of the ratchet 56. The pivot 61 of the rocking arm 58 can be adjusted in different positions for setting the angular rotation as desired. The middle position is illustrated in Fig. 5 of the drawings. The pivot 61 of the rocking arm 58 is disposed in a guide 62 and is in connection with a rod 63, which can be adjusted by a hand-wheel 64, co-operating with a dial. According to the adjustment of the pivot 61, the stop 57 co-operates with the pawl 59 at an earlier or later stage and thus operates the ratchet 56 and causes a larger or smaller forward feed of the bread.

In case the bread has been fed into its end position by the angle 55, the latter comes into contact with a pin 86 (Fig. 8), which is resiliently disposed in the casing 2 and pressed onto the slide 3 and thus brakes the operation of the latter.

Therefore the crank handle 5 is subjected to a resistance, which indicates to the operator of the machine, that a new bread has to be inserted in order to prevent a useless pressure of the butter (Fig. 8). By means of a key-like stop 87 the operation of the machine is automatically interrupted in case the same is driven by means of an electro-motor. By means of a double armed lever 65, the connecting rod 63 is connected with a stop-bar 66, which is slidably arranged in the frame of the machine and on which rests the roller of a bolt 67, guided in the slide 3. The bolt 67 acts upon one arm of a double-armed lever 68, the other arm of the latter being in connection with the spreading device 25. Thus also the spreading device is adjusted according to the adjusted thickness of the bread, so that the relative position or the said device with respect to the bread is always the same quite independent of the adjusted thickness of the slice of bread, and therefore the mouth of the spreading device 25 always rests on the bread.

The movement of the spreading device 25 towards the bread is carried out against the action of springs 89, which have the tendency to return into the initial position the spreading device and thus also continuously press the roller of the bolt 67 against the stop 66.

In place of a circular disc-shaped cutter 15 also a cutter in the form of an endless band may be employed. Such a construction is shown by way of example in Fig. 6. The endless cutter-band 16 passes over rollers 69, 70, the roller 69 being driven, while the roller 70 serves as tensioning roller, for which object its shaft is subjected to spring-action. The band-cutter is provided with holes, which are engaged by pins of the driving roller 69, in order to prevent a sliding of the band-cutter.

In order to prevent the bread covered with butter from falling onto its buttered side after it is cut off, the cutter is arranged according to the present invention in such a manner, that the last severance of the bread takes place at the top edge, thus the cut-off slice is held at the top corner until shortly before the severance is completed. For this object the circular cutter is mounted eccentrically downward opposite the middle of the bread, while in case of employing a band-cutter the latter has to be inclined backward at an angle. A sliding-off device 71, preferably consisting of a wire-network, is mounted in the casing 1 underneath the bread. Below the device 71 is arranged a drawer 72, the front wall of the latter being adapted to be folded down and forming an extension of the floor of the drawer. A sliding-off device 73 is arranged in the drawer and in the event of pulling out the drawer (shown in dash-dotted lines) forms an extension of the sliding face 71, but leaves free a slot in front of the same. The cut off crust of bread drops through this slot into the refuse-receptacle 74 of the drawer and also other refuse pass through the sieve 71 into the said receptacle 74.

The butter or other material, which is to be spread onto the bread, has to possess a certain spreading capacity, in order to render possible a faultless operation of the machine. For this object a mixer is mounted in the frame of the machine so as to be pulled out in the manner of a drawer, the said mixer being provided with a piston 76, which is arranged in a receptacle 75 and continuously moved forward by a shaft 77, rotated by the driving means, and which by means of a propeller 78 mounted on the screw-threaded shaft 77, forces the spreading material through a sieve 79, closing the front of the receptacle 75.

After removing the lid 82, the butter-receptacle 21 is secured to the mixer by means of a bayonet-catch 81 and thus the receptacle 21 is charged. In the propeller-vanes are mounted electric heating members, which heat the butter in case of cold weather. In warm weather the receptacle 75 can be cooled and for this object the latter is enclosed in a jacket 80 for the cooling means. If desired the jacket can be utilized also for heating the butter.

Figure 9:
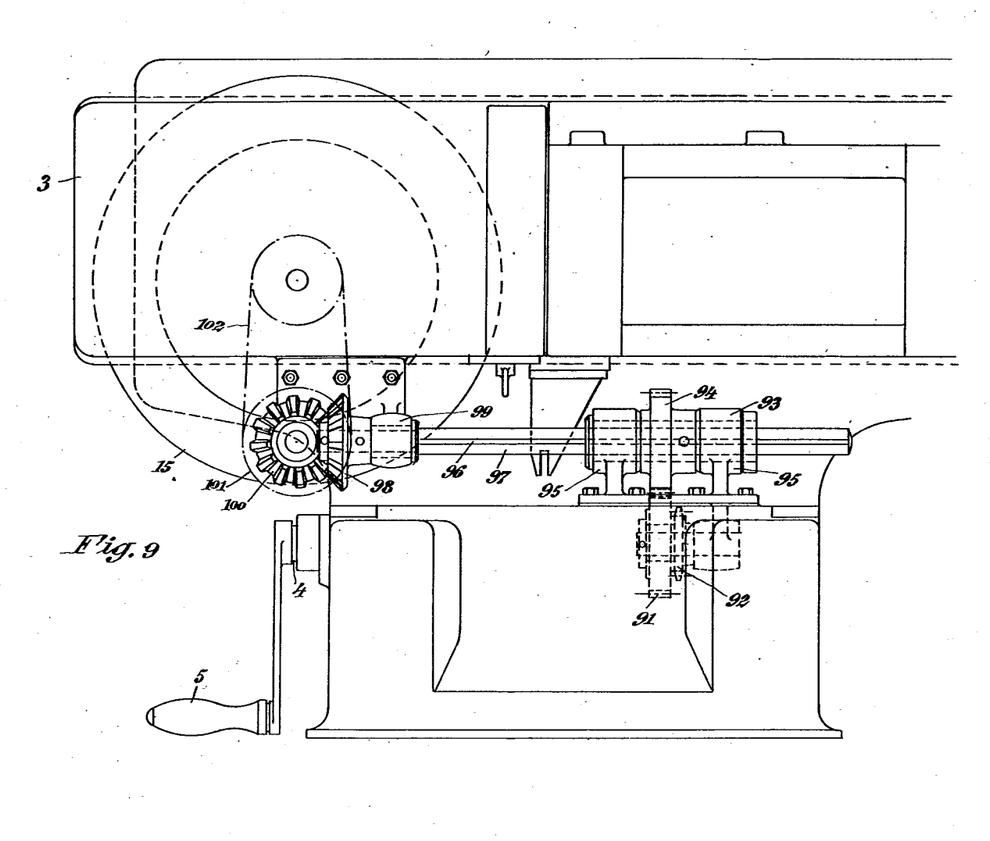
Figs. 9 and 10 show in elevation two modified constructions of the means for operating the cutter.

In the modified construction shown in Fig. 9, the disc-shaped cutter 15 is rotated by means of a bevel-wheel drive. For this object the shaft 4, operated by the crank-handle 5, is furnished with a chain-wheel 90, which by means of an endless chain (Fig. 5) drives a chain-wheel 92, arranged in the forward end of the casing 1 and connected with a toothed wheel 91. The latter meshes with a toothed wheel 94, mounted on a sleeve 93, which is secured against lateral movement by means of two bearings, secured to the casing 1. A shaft 97, provided with a longitudinally extending groove 96, passes freely slidable through the said bearings and sleeves. To one end of the shaft 97 is secured a bevel-wheel 98, which by means of a bearing 99 secured to the slide 3 is forced to carry out the reciprocating movement of the slide. The rotation of the shaft 97 is effected by a wedge, pin or the like, which engages the longitudinal groove 96 of the said shaft. The bevel-wheel 98 cooperates with a bevel-wheel 100, which is rigidly connected with a chain-wheel 101, rope pulley or the like and drives the disc-shaped cutter 15 by means of a chain 102 or the like.

Figure 10:
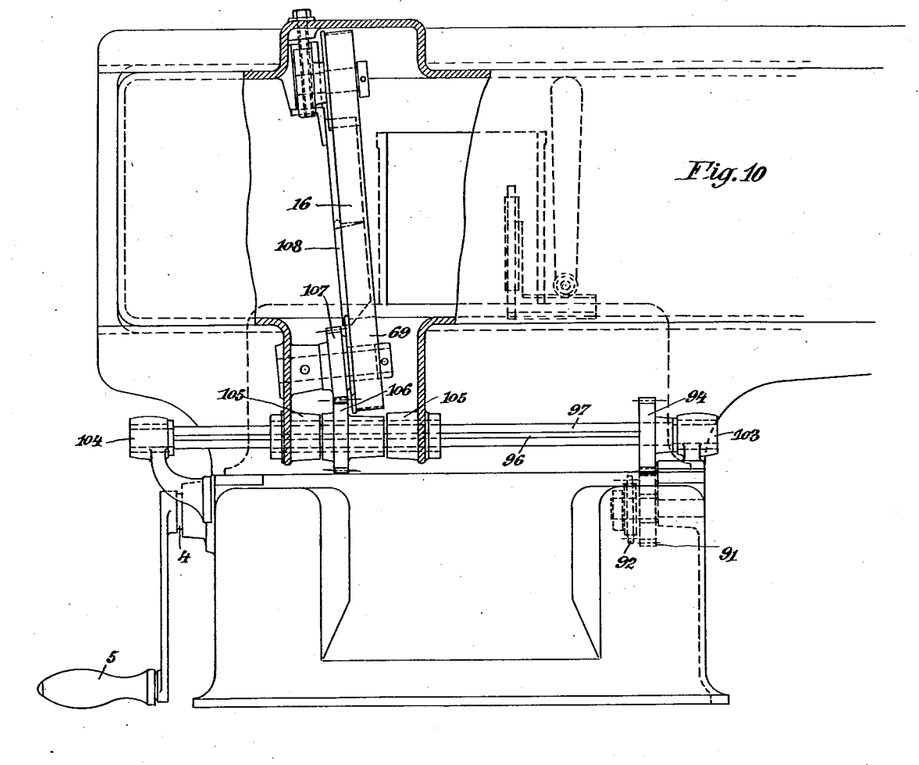

In the construction shown in Fig. 10, the toothed wheel 94 is rigidly connected with the shaft 97, which is secured against lateral movement by means of two bearings 103 and 104. On the shaft 97, provided with the longitudinal groove 96, is slidably mounted a bevel-wheel 106, which is disposed between two bearings 105, connected with the slide 3. The bevel-wheel 106 operates a bevel-wheel 107, which is mounted at an incline on the slide 3. A disc 69 is rigidly connected with the bevel-wheel 107, and the band-cutter 16 passes over the disc 69 and a disc 70. A supporting face 108, which is of wedge-shape in cross section and secured to the slide 3, serves for supporting the band-cutter in the direction of cutting.

The receptacle 21 is charged with butter and the bread is inserted in the upper part 2 of the frame. When turning the crank handle 5, the bevel wheel arranged on the shaft 4 and the bevel-wheel which is in mesh with the latter and consequently also the disc 6 connected with the bevel-wheel last mentioned are rotated. In view thereof the lever 8 is rocked, thereby causing the reciprocation of the slide 3 by means of the pin 10 and bolt 11. The stop 57, mounted on the rocking lever 8, operates the pawl 59 pivotally secured to the rocking arm 58, the said pawl rotating the ratchet-gearing 56 and thus the shaft 53 which operates the bracket 55, thereby feeding forward the bread bearing against the latter for a distance, which can be set by adjusting the rod 63 by means of the hand-wheel 64 (Fig. 5). By means of the double armed lever 65, the rod 63 operates the stop-bar 66, on which runs the roller of the bolt 67 of the double-armed lever 68, which is in connection with the spreading device 25.

Owing to this construction the spreading device is continuously moved towards and rests on the bread.

Figure 3:
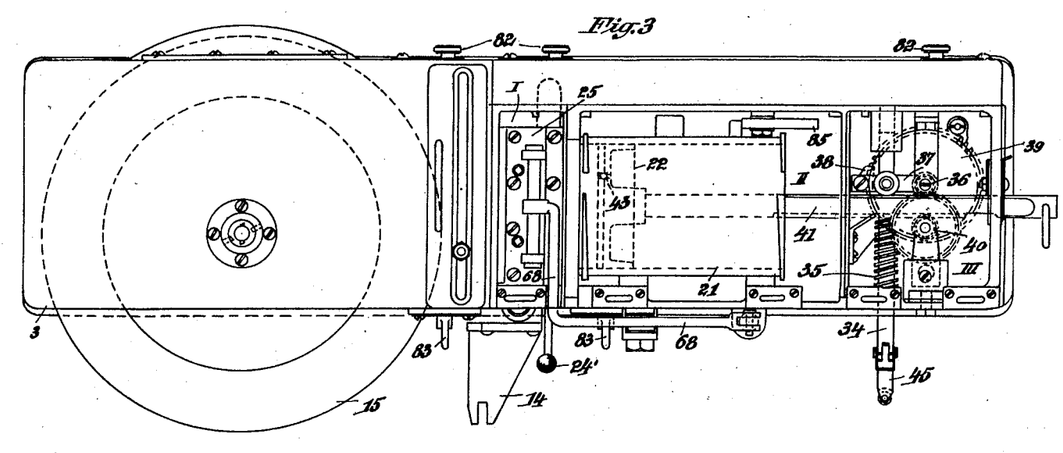
Figs. 3 and 4 illustrate in front view and longitudinal section the slide with the lid removed.

The butter in the receptacle 21 is fed forward by the piston 22 provided with the rack-shaped piston rod 41 (Fig. 3). The piston is fed forward by the pinion 40 which engages the rack-shaped piston rod 41. The pinion 40 is operated in that the end 45 of the bolt 34 runs up the inclined rail 27 and thus turns the lever 37 for the desired distance by means of the pawl 38, which co-operates with the ratchet-wheel 39. Thereby the intermediate gear-wheels feed the pinion 40 and the piston 22 the desired distance.

The quantity of butter, which is to be spread onto the bread, is regulated by turning the hand-wheel 33 and thus operating the rod 32, the lever 31 and the pin 29 (Fig. 2) whereby the latter rotates the eccentric disc 28, which sets the inclined guide-rail 27.

As soon as the spreading device 25 has reached the end of the bread, the stop 46 for setting the thickness of the slice of bread to be cut off is moved in such a manner by means of the ratchet-lever 51 and the connecting rod 52, that the end 45 of the bolt 34 is moved away from the rail 27, thereby interrupting the forward feed of the bread.

When the slide 3 is moving forward, the cutter is rotated by the pinion 18 which is in mesh with the rack 17 and is moved towards the bread. The butter moved forward by the piston 22 is forced into the spreading device 25 and is spread onto the bread by means of the adjustable wedge-shaped member 23 (Fig. 4). Now the rotating cutter which moves forward cuts off the buttered slice of bread, which drops onto the sliding-off device 71 and slides out of the machine.

I claim:

1. In a machine for slicing and buttering bread and the like the combination of a reciprocating slide, a cutter in the said slide, a casing arranged independent of the said cutter, and a spreading device provided with a butter-receptacle and a butter supply device and arranged in the said independent casing, with a feed mechanism for the butter supply device, a spreader distributing the butter over the bread, means for removably attaching the casing of the spreading device to the said reciprocating slide, and means for detachably mounting the individual parts in the said slide.

2. Machine as claimed in claim 1, further comprising a second casing provided with a lid in which the butter-receptacle is removably located, the said second casing being arranged in the independent casing.

3. Machine as claimed in claim 1, in which the butter supply device comprises a piston fed forward by the said feed mechanism, and a rod disengageably connected with the said piston for removing the butter-receptacle together with the piston from the casing without disturbing the feed mechanism.

4. In a machine for slicing and buttering bread and the like the combination of a reciprocating slide, a circular cutter in the said slide, a casing arranged independent of the said cutter, and a spreading device provided with a butter-receptacle and a butter supply device and arranged in the said independent casing, with a feed mechanism for the butter supply device, a spreader distributing the butter over the bread, means for removably attaching the casing of the spreading device to the said reciprocating slide, means for detachably mounting the individual parts in the said slide, a pinion secured to the shaft of the circular cutter, and a rack arranged above and cooperating with the said pinion, the latter being forced into intimate engagement with the rack by the action of cooperation between the bottom half of the cutter and the bread.

5. Machine as claimed in claim 4, further comprising a detachable crank secured to the cutter-shaft for operating the cutter independently of any other part of the machine.

6. Machine as claimed in claim 1, further comprising adjustable knives in front of the cutter for cutting off the bread-crust.

7. Machine as claimed in claim 1, further comprising an adjustable wedge-shaped member in the spreading device for controlling the thickness of butter-discharge.

8. In a machine for slicing and buttering bread and the like the combination of a reciprocating slide, a cutter in the said slide, a casing arranged independent of the said cutter, a spreading device provided with a butter-receptacle and a butter supply device and arranged in the said independent casing, with a feed mechanism for the butter supply device, an inclined rail for uniformly operating the feed mechanism, a spreader distributing the butter over the bread, means for removably attaching the casing of the spreading device to the said reciprocating slide, and means for detachably mounting the individual parts in the said slide.

9. In a machine for slicing and buttering bread and the like the combination of a reciprocating slide, a cutter in the said slide, a casing arranged independent of the said cutter, a spreading device provided with a butter-receptacle and a butter supply device and arranged in the said independent casing, with a feed mechanism for the butter supply device, an inclined rail for uniformly operating the feed mechanism, means for adjusting the incline of the said rail for controlling the extent of the feed of the feed mechanism, a spreader distributing the butter over the bread, means for removably attaching the casing of the spreading device to the said reciprocating slide, and means for detachably mounting the individual parts in the said slide.

10. Machine as claimed in claim 9, further comprising means for adjusting the rail in a horizontal position and thereby disengaging the spreading device.

11. Machine for slicing and buttering bread and the like, comprising a reciprocating slide, a cutter arranged in the said slide, a casing arranged independent of the said cutter, a spreading device provided with a butter-receptacle and a butter-supply device, a piston in the latter for feeding the butter, a piston-rod attached to the piston, and a feed mechanism operated by the movement of the said slide, the said mechanism consisting of a bolt operating the said piston, a rail on which the bolt operates, and means for adjusting the rail at an angle for controlling the extent of the feed of the piston.

12. Machine as claimed in claim 11, further comprising a valve arranged in the piston admitting air in front of the latter when withdrawing the piston.

13. Machine as claimed in claim 11, further comprising a ratchet wheel secured to the said piston-rod, and a hand wheel mounted on the latter for manually feeding forward the piston.

14. Machine as claimed in claim 11, in which the bolt consists of a fixed part and a hinged part, and a roller mounted on the hinged part of the bolt.

15. Machine as claimed in claim 11, in which the bolt consists of a fixed part and a hinged part, a roller mounted on the said hinged part, and an adjustable stop extending into the path of movement of the said bolt for limiting the advance of the piston.

16. Machine as claimed in claim 11, in which the bolt consists of a fixed part and a hinged part, a roller mounted on the said hinged part, an adjustable stop extending into the path of movement of the said bolt for limiting the advance of the piston, and means connecting the said stop with the slide.

17. Machine as claimed in claim 11, in which the bolt consists of a fixed part and a hinged part, a roller mounted on the said hinged part, an adjustable stop extending into the path of movement of the said bolt for limiting the advance of the piston, means connecting the said stop with the slide, a bar cooperating with the bolt, an intermediate wall connected with the stop, and a device securing in position the said wall.

18. In a machine for slicing and buttering bread and the like the combination of a reciprocating slide, a cutter in the said slide, a casing arranged independent of the said cutter, and a spreading device provided with a butter-receptacle and a butter supply device and arranged in the said independent casing, with a feed mechanism for the butter supply device consisting of a feed shaft located in the said casing, a pawl and ratchet gear cooperating with the said feed shaft, an adjustable stop on the said gear, a rocking lever for operating the pawl and ratchet gear, a rocking bar provided with a hook-shaped pawl, a stop arranged on the said rocking lever, a spreader distributing the butter over the bread, means for removably attaching the casing of the spreading device to the said reciprocating slide, and means for detachably mounting the individual parts in the said slide.

19. Machine as claimed in claim 18, further comprising a guide in which the pivot of the rocking lever is adjustably disposed.

20. Machine as claimed in claim 18, further comprising a guide in which the pivot of the rocking lever is adjustably disposed, an adjustable pull-rod to which the said guide is secured, and a hand-wheel provided with a dial for adjusting the said pull-rod.

21. Machine as claimed in claim 18, further comprising means positively connecting the said slide with the said spreading device for automatically adjusting the latter according to the feed of the bread.

22. Machine as claimed in claim 18, further comprising a guide in which the pivot of the rocking lever is adjustably disposed, an adjustable pull-rod to which the said guide is secured, a hand-wheel provided with a dial for adjusting the said pull-rod, a bar cooperating with the said pull-rod, a double-armed lever carrying the said spreading device, and a bolt cooperating with the said bar.

23. Machine as claimed in claim 18, further comprising a guide in which the pivot of the rocking lever is adjustably disposed, an adjustable pull-rod to which the said guide is secured, a hand-wheel provided with a dial for adjusting the said pull-rod, a bar cooperating with the said pull-rod, a double-armed lever carrying the said spreading device, a bolt cooperating with the said bar, and a spring cooperating with the spreading device tending to move away the latter from the bread.

24. Machine as claimed in claim 18, further comprising an angle-shaped member resting on the back of the bread, and a bolt secured to the wall of the casing and extending into the path of movement of the said angle-shaped member.

25. Machine as claimed in claim 1, in which the cutter is inclined with respect to the middle of the bread.

26. Machine as claimed in claim 1, further comprising a sliding-off arrangement disposed in the said casing, and a drawer furnished with a tilting front wall arranged underneath the said sliding-off arrangement.

27. Machine as claimed in claim 1, further comprising a sliding-off arrangement disposed in the said casing, a drawer furnished with a tilting front wall arranged underneath the said sliding-off arrangement, and a discharge device mounted in the said drawer.

28. Machine as claimed in claim 1, further comprising a sliding-off arrangement disposed in the said casing, a drawer furnished with a tilting front wall arranged underneath the said sliding-off arrangement, a discharge device mounted in the said drawer, a gap remaining between the sliding-off arrangement and the discharge device, and a refuse-receptacle located underneath the said gap.

In testimony whereof I affix my signature.

WALTER STEINKELLNER.